United States Patent [19]

Asoh et al.

[11] Patent Number: 5,182,363
[45] Date of Patent: Jan. 26, 1993

[54] PROCESS FOR PRODUCING POWDER AGGREGATE PARTICLE OF HIGH MOLECULAR WEIGHT POLYCARBONATE RESIN

[75] Inventors: Toshiaki Asoh; Tatsuhide Hosomi, both of Toyonaka, Japan

[73] Assignee: Mitsubishi Gas Chemical Co., Inc., Tokyo, Japan

[21] Appl. No.: 795,544

[22] Filed: Nov. 21, 1991

[30] Foreign Application Priority Data

Nov. 30, 1990 [JP] Japan ................................. 2-330352

[51] Int. Cl.$^5$ ............................................. C08G 64/40
[52] U.S. Cl. .................................... 528/499; 528/196; 528/480; 528/501; 528/502
[58] Field of Search ............... 528/499, 501, 480, 502, 528/196

[56] References Cited

U.S. PATENT DOCUMENTS 4,452,976  6/1984  Kohyama et al. ................... 528/499
4,668,768  5/1987  Mendiratta et al. .

FOREIGN PATENT DOCUMENTS 0116836  8/1984  European Pat. Off. .
0300485  1/1989  European Pat. Off. .
61-250026  11/1986  Japan .

OTHER PUBLICATIONS

Patent Abstracts of Japan, vol. 11, No. 101 (C-413)[2548], Mar. 31, 1987; & JP-A-61 250 026 (Mitsubishi Gas Chem. Co., Inc.).

Primary Examiner—Harold D. Anderson
Attorney, Agent, or Firm—Sughrue, Mion, Zinn, Macpeak & Seas

[57] ABSTRACT

Disclosed is a process for producing powder aggregate particle of high molecular weight polycarbonate resin which comprises adding a poor solvent to a solution containing 3 to 8% by weight of high molecular weight polycarbonate resin having a viscosity average molecular weight of at least 70,000 in a solvent in a ratio of the poor solvent to the solution of the polycarbonate resin of 0.2 to 0.6 by volume, continuously pouring the resulting mixture into water heated to a higher temperature than a boiling point of a solvent of the solution of the polycarbonate resin, thereby suspending the mixture in the warm water, distilling out the solvent and the poor solvent from the mixture, thereby obtaining a slurry of the polycarbonate resin and water in the following ratio by volume:

Solvent/polycarbonate resin ≦0.55
Solvent/poor solvent ≦0.7, and recycling at least a portion of the slurry to a wet-process pulverizer, while further distilling out the solvent and the poor solvent from the slurry.

5 Claims, No Drawings

PROCESS FOR PRODUCING POWDER AGGREGATE PARTICLE OF HIGH MOLECULAR WEIGHT POLYCARBONATE RESIN

BACKGROUND OF THE INVENTION

This invention relates to a process for producing powder aggregate particle of polycarbonate resin from a solution of polycarbonate resin having a high molecular weight, that is, a viscosity average molecular weight of at least 70,000, and more particularly is a process for producing powder aggregate particle of high molecular weight polycarbonate resin having a large particle sizes and a high bulk density, free from fine powders, from a solution of high molecular weight polycarbonate resin.

The powder aggregate particle of high molecular weight polycarbonate resin produced according to the present invention can be readily dried and also readily handled in the molding, etc. The term "powder aggregate particle" used herein refers to porous particle comprised of an aggregate of powder formed by precipitation. The high molecular weight polycarbonate resin is useful for producing films.

Solidification of polycarbonate resin from a polycarbonate resin solution can be carried out by adding a non-solvent to the polycarbonate resin solution to precipitate the polycarbonate resin (precipitation procedure) or by distilling out a solvent from the polycarbonate resin solution, thereby concentrating the solution to obtain powder (concentration procedure). However, high molecular weight polycarbonate resin having viscosity average molecular weight of at least 70,000, that is a higher molecular weight than that of the ordinary polycarbonate resin, cannot be solidified satisfactorily by these procedures. For example, in the precipitation procedure the solidified polycarbonate resin undergoes leather like surface formation i.e. formation of leather like surface of solidified polycarbonate resin on the outside of solvent droplets, unless the polycarbonate resin solution is at a very low concentration. When the polycarbonate resin solution is at an extremely low concentration, not only the solvent must be used in a large amount, but also the solidified polycarbonate resin turns fine powder. On the other hand, in the concentration procedure to distill out the solvent from the solution the solidified polycarbonate resin undergoes leather like surface formation or turns sticky masses, which will turn into a fiber state by crushing.

Japanese Patent application Kokai (Laid-open) No. 61-250026 discloses a process for the solidification of a polycarbonate resin solution having a 10 to 25% by weight of polycarbonate resin by adding a poor solvent to the solution and pouring the resulting mixture into warm water, but it has been found that high molecular weight polycarbonate resin cannot be solidified satisfactorily.

SUMMARY OF THE INVENTION

An object of the present invention is to provide a process for producing powder aggregate particle of polycarbonate resin having large particle sizes and a high bulk density free from fine powder, which can be readily dried and also readily handled in the molding, etc., from a solution of high molecular weight polycarbonate resin of a viscosity average molecular weight of at least 70,000, more particularly 80,000 or more.

The present invention provides a process for producing powder aggregate particle of high molecular weight polycarbonate resin, which comprises adding a poor solvent to a solution containing 3 to 8% by weight of high molecular weight polycarbonate resin having a viscosity average molecular weight of at least 70,000 in a solvent in a ratio of the non-solvent to the solution of the polycarbonate resin of 0.2 to 0.6 by volume, continuously pouring the resulting mixture into water heated to a higher temperature than a boiling point of a solvent of the solution of the polycarbonate resin, thereby suspending the mixture in the warm water, distilling out the solvent and the poor solvent from the mixture, thereby obtaining a slurry of the polycarbonate resin and water in the following ratio by volume:

Solvent/polycarbonate resin≦0.55

Solvent/poor solvent≦0.7, and recyclically passing at least a portion of the slurry to a wet-process pulverizer while further distilling out the solvent and the poor solvent from the slurry.

DETAILED DESCRIPTION OF THE INVENTION

Polycarbonate resin for use in the present invention is high molecular weight polycarbonate resin having a viscosity average molecular weight of at least 70,000, more particularly 80,000 to 250,000, which is homopolymers or copolymers of aromatic polycarbonate resin prepared by reaction of a dihydric phenol-based compound as the main component with phosgene, using a small amount of a molecular weight-controlling agent and an optional branching agent, according to a process similar to the ordinary process for producing polycarbonate resin, that is, an interfacial polymerization process, or may be a mixture of at least two of the homopolymers and copolymers.

Preferably, the dihydric phenol-based compound for use in the interfacial polymerization process are compounds represented by the following general formula:

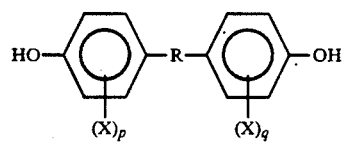

wherein R is a divalent aliphatic group having 1 to 15 carbon atoms, a alicyclic group or a phenyl-substituted alkyl group, or —O—, —S—, —SO—, —SO$_2$— or —CO—; X is an alkyl group, an aryl group or a halogen atom; and p and q are integers of 0 to 2, and more specifically includes, for example, bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl) sulfide, bis(4-hydroxyphenyl)ketone, 1,1-bis(4-hydroxyphenyl)ethane, 2,2-bis(4-hydroxyphenyl) propane, 2,2-bis(4-hydroxyphenyl)butane, 1,1-bis(4-hydroxyphenyl) cyclohexane, 2,2-bis(4-hydroxy-3,5-dibromophenyl) propane, 2,2-bis(4-hydroxy-3,5-chlorophenyl) propane, 2,2-bis(4-hydroxy-3-bromophenyl) propane, 2,2-bis(4-hydroxy-3-chlorophenyl)propane, 2,2-bis(4-hydroxy-3,5-dimethylphenyl) propane, 2,2-bis(4-hydroxy-3-methylphenyl) propane, 1,1-bis(4-hydroxyphenyl)-1-phenylethane, and bis(4-hydroxyphenyl) diphenylethane. Particularly preferable is 2,2-bis(4-hydroxyphenyl) propane (bisphenol A).

The branching agent for use in the interfacial polymerization process includes, for example, polyhydroxy compounds such as fluoroglycine, 4,6-dimethyl-2,4,6-tri(4-hydroxypheny)heptene-2,4,6-dimethyl-2,4,6-tri(4-hydroxyphenyl)heptane, 2,6-dimethyl-2,4,6-tri(4-hydroxy)heptane-3,4,6-dimethyl-2,4,6-tri(4-hydroxyphenyl) heptane, 1,3,5-tri(4-hydroxyphenyl)benzene and 1,1,1-tri(4-hydroxyphenyl)ethane, and 3,3-bis(4-hydroxyaryl) oxyindole (=isatin(bisphenol)), 5-chloroisatin, 5,7-dichloroisatinbisphenol and 5-bromisatin, partially substituted with said dihydroxy compound, for example, 0.1 to 2% by mole thereof with the polyhydroxy compound.

The molecular weight-controlling agent for the interfacial polymerization process is preferably monovalent aromatic hydroxy compounds, and includes, for example, m- or p-propylphenols, p-bromophenol, p-tert-butylphenol and p-long chain alkyl-substituted phenol.

The solvent for use in the interfacial polymerization process is chlorinated aliphatic or aromatic hydrocarbons, and includes, for example, methylene chloride, 1,1-dichlorotoluene, chlorobenzene and chlorotoluene. Particularly preferable is methylene chloride.

The solution of polycarbonate resin prepared by the interfacial polymerization process is then subjected to removal of a catalyst, neutralization, water washing, concentration, etc. according to the ordinary procedure to obtain a solution of polycarbonate resin for use in the present invention. The thus obtained solution contains 3 to 8% by weight, preferably 4 to 6% by weight of polycarbonate resin.

A poor solvent is added to the solution of polycarbonate resin usually at room temperature, followed by mixing.

It is preferable that the poor solvent (solvent for solidification) for use in the present invention has a higher boiling point than that of the solvent for the solution of polycarbonate resin, and includes, for example, hexane, heptane, toluene, etc., preferably hexane and toluene, more preferably heptane. Usually 0.2 to 0.6 parts by volume, preferably 0.3 to 0.5 parts by volume, of the poor solvent is used per part by volume of the solution of polycarbonate resin. An amount of the poor solvent and a temperature for adding the non-solvent are such as to form a gel when the mixture is left standing at that temperature or form precipitates when the temperature is lowered.

After the addition of the poor solvent, the resulting mixture is continuously poured into warm water heated to a temperature higher than the boiling point of the solvent to distill out the solvent and the poor solvent from the mixture and obtain a slurry of water and polycarbonate resin, which contains the solvent and the poor solvent, in the following ratio by volume:

Solvent/polycarbonate resin $\leq 0.55$

Solvent/poor solvent $\leq 0.7$

Then, is recyclically passed at least a portion of the slurry to a wet-process pulverizer, while further distilling out the solvent and the poor solvent from the slurry.

In the present invention, it seems that the solvent for the polycarbonate resin has a compatibility with both polycarbonate resin and poor solvent and consequently there is a scramble for the solvent between the polycarbonate resin and the poor solvent as a phenomenon, resulting in dominance of the non-solvent over the polycarbonate resin to form precipitates. Furthermore, it can be presumed that, since the mixed solvent (solvent and poor solvent) has no complete compatibility with the polycarbonate resin, precipitation, i.e. formation of a slurry of polycarbonate and water, takes place in such a high concentrated state as not so expected in the ordinary procedure (procedure for precipitating polycarbonate resin by adding a non-solvent to a solution of polycarbonate resin), as the proportion of the solvent to the polycarbonate resin is decreased by distilling out the solvent and the non-solvent. Even if the remaining solvent and non-solvent are further distilled out by elevating the temperatures, there occurs no fusion of the precipitates because there is still a larger amount of the poor solvent, and thus it can be presumed that precipitates of larger particle sizes and a higher bulk density can be obtained.

Distilling out the solvent and the poor solvent is carried out by pouring the mixture of the solution of polycarbonate resin with the poor solvent into warm water and heating the resulting mixture with the warm water to a temperature higher than the boiling point of the solvent, thereby forming a slurry of polycarbonate and water. After the formation of the slurry, further distilling out the solvent and the poor solvent is carried out preferably at a temperature of 90° to 100° C. It is one of preferable modes to distill out the solvent and the poor solvent at 40° to 60° C., thereby forming a slurry of polycarbonate and water and then distill out the remaining solvent and poor solvent by elevating the temperature to 90° to 100° C. Total time required for distilling out the solvent and the poor solvent is usually 0.1 to 1.0 hour, preferably 0.5 to 1.0 hour.

In the present invention, at least a portion of the slurry of polycarbonate resin and water is recyclically passed to a wet-process pulverizer and pulverized, while distilling out the solvent and the poor solvent from the slurry. Hourly recyclic rate of the slurry to be passed to the wet-process pulverizer is 1 to 30 times, preferably 5 to 20 times, the volume of the total slurry. The wet-process pulverizer for use in the present invention can be a commercially available one, suoh as Gorator (trademark of a pulverizer made by Aikawa Tekkosho K.K., Japan) and Disintegrator (trademark of a pulverizer made by Komatsu Zenoah Co. K.K., Japan).

Powder aggregate particle of polycarbonate resin in the slurry of high molecular weight polycarbonate resin and water ultimately obtained according to the present invention is powder aggregate particle containing 90% by weight or more of solid matters after drying, and having an average diameter of 0.5 to 2 mm and a bulk density of 0.12 to 0.3 g/cm$^3$. The powder aggregate particle in a slurry state has a low flow resistance during the transfer through pipings, and in the post treatments their water separation and drying can be efficiently carried out. The powder aggregate particle is usually dried with hot air at a drying temperature of 100° to 170° C., preferably 120° to 150° C.. for 6 to 30 hours.

REFERRED EMBODIMENTS OF THE INVENTION

The present invention will be described in detail below, referring to Examples, where a viscosity average molecular weight was determined according to the following procedure.

Polycarbonate (0.16 g) was dissolved in methylene chloride (100 ml), and the resulting solution was subjected to determination of specific viscosity ($\eta_{sp}$) by a Uberode viscometer. Likewise, specific viscosities at other concentrations were determined.

$$[\eta] = \lim_{c \to 0} \eta_{sp}/C \quad C: \text{concentration}$$

From the foregoing equation, an intrinsic viscosity $[\eta]$ was determined, from which a viscosity average molecular weight was determined according to the following Schnell's equation:

Schnell's equation: $[\eta] = 1.23 \times 10^{-4} M^{0.83}$

EXAMPLE 1

350 l of n-heptane as a poor solvent was added to 1,000 l of a solution of polycarbonate resin having a viscosity average molecular weight of 80,000 in methylene chloride as a solvent (concentration of polycarbonate resin: 5.5% by weight) at room temperature with stirring. The mixture was poured into warm water at 48° C. with heating and stirring to distill out mainly the solvent methylene chloride to make the following ratios by volume:

Solvent/polycarbonate = 0.19
Solvent/poor solvent = 0.64

Then, the mixture was heated to 97° C. and recyclically passed to a wet-process pulverizer (Gorator: trademark) at a rate of 40 m³/hr, while distilling out the solvent and the poor solvent n-heptane as the poor solvent, and wet pulverized, whereby a slurry of solidified bead-shaped polycarbonate resin and water. Solidification time was about one hour. Then, the solid matters were separated from the slurry and dried with recycling hot air at 120° C. for 24 hours. Particle size distribution and bulk density of the thus obtained powder aggregate particle was determined. The results are shown in the following Table 1.

EXAMPLES 2 TO 4

Treatment was carried out in the same manner as in Example 1, except that a solution containing 7.2 wt.% of polycarbonate resin having a viscosity average molecular weight of 100,000 (Example 2), a solution containing 7.5 wt.% of polycarbonate resin having a viscosity average molecular weight of 100,000 (Example 3), and a solution containing 6.0 wt.% of polycarbonate resin having a viscosity average molecular weight of 180,000 (Example 4) were used in place of the solution containing 5.5 wt.% of polycarbonate resin having a viscosity average molecular weight of 80,000 of Example 1. The results are shown in the following Table 1.

COMPARATIVE EXAMPLE 1

Treatment was carried out in the same manner as in Example 1 except that no n-heptane as the poor solvent was used. It was found that the solidified polycarbonate resin turned fibrous and no powder aggregate particle was obtained. The results are shown in the following Table 1.

COMPARATIVE EXAMPLE 2

200 l of isopropanol was added to the solution of Example 1, and, after stirring, the mixture was dropwise added to 1,400 l of isopropanol over one hour. The resulting precipitates were recovered by filtration and dried at 120° C. in reduced pressure. The results are shown in the following Table 1.

COMPARATIVE EXAMPLE 3

Treatment was carried out in the same manner as in Example 1 except that the concentration of the polycarbonate resin solution was changed to 10 wt.%. After addition of n-heptane to the solution, the mixture was poured into warm water at 48° C., and stirred and subjected to wet-process pulverization. Masses of polycarbonate resin were formed, resulting in clogging in the pulverizer.

TABLE 1

| | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Particle size distribution | | | | | | | |
| 10 mesh on | 26.5 | 37.5 | 36.9 | 31.0 | Failure in powder aggregate particle formation (Formation of fibrous state) | 3.2 | Failure in powder aggregate particle formation (formation of masses) (or lumps) |
| 10–14 mesh | 40.9 | 44.5 | 46.3 | 40.1 | | 5.7 | |
| 14–18.5 mesh | 18.2 | 11.3 | 10.5 | 18.0 | | 8.6 | |
| 18.5–30 mesh | 10.3 | 5.5 | 5.0 | 8.8 | | 16.7 | |
| 30–42 mesh | 2.4 | 0.6 | 1.0 | 1.1 | | 26.4 | |
| 42–83 mesh | 1.7 | 0.6 | 0.3 | 1.1 | | 30.9 | |
| 83 mesh pass through | 0 | 0 | 0 | 0 | | 8.5 | |
| Bulk density g/cm³ | 0.153 | 0.171 | 0.193 | 0.181 | — | 0.098 | — |

According to the present invention, high molecular weight polycarbonate resin having a viscosity average molecular weight of at least 70,000, which has been so far hard to solidify, can be satisfactorily solidified. That is, the present invention can produce powder aggregate particle of porous readily dryable, high molecular weight polycarbonate resin having large particle sizes, free from fine powder, from a solution of high molecular weight polycarbonate resin. Still more, bead-like aggregate can be obtained, depending upon the conditions. The powder aggregate particle obtained according to the present invention have a higher bulk density than that obtained by the precipitation procedure and can be readily handled in the molding, etc.

What is claimed is:

1. A process for producing powder aggregate particle of high molecular weight polycarbonate resin, which comprises adding a poor solvent to a solution containing 3 to 8% by weight of high molecular weight polycarbonate resin having a viscosity average molecular weight of at least 70,000 in a solvent in a ratio of the poor solvent to the solution of the polycarbonate resin of 0.2 to 0.6 by volume, continuously pouring the resulting mixture into water heated to a higher temperature than a boiling point of a solvent of the solution of the polycarbonate resin, thereby suspending the mixture in the warm water, distilling out solvent and poor solvent from the mixture, thereby obtaining a slurry of the polycarbonate resin and water in the following ratio by volume:

Solvent/polycarbonate resin $\leq 0.55$
Solvent/poor solvent $\leq 0.7$, and recycling at least a portion of the slurry to a wet-process pulverizer, while further distilling out solvent and the poor solvent from the slurry.

2. A process according to claim 1, wherien a hourly recyclic rate of the slurry to the wet-process pulverizer is 1 to 30 times the total voluem of the slurry.

3. A process according to claim 1, wherein the high molecular weight polycarbonate resin is polycarbonate resin having a viscosity average molecular weight of 80,000 to 250,000.

4. A process according to claim 1, wherein the solvent and the poor solvent are distilled out at 90° to 100° C. after obtaining the slurry of polycarbonate resin and water.

5. A process according to claim 4, wherein the slurry of polycarbonate resin and water is obtained by distilling out the solvent and the poor solvent at a temperature of 40° to 60° C.

* * * * *